United States Patent [19]
Gentile

[11] Patent Number: 4,793,093
[45] Date of Patent: Dec. 27, 1988

[54] FEEDING STATION FOR VERMIN

[75] Inventor: James L. Gentile, Orange, Conn.

[73] Assignee: Chesebrough-Pond's Inc., Greenwich, Conn.

[21] Appl. No.: 60,192

[22] Filed: Jun. 10, 1987

[51] Int. Cl.4 .............................................. A01M 1/20
[52] U.S. Cl. ........................................ 43/131; 43/32.1
[58] Field of Search ....................... 43/131, 132.1, 121

[56] References Cited

U.S. PATENT DOCUMENTS

| 547,220 | 10/1895 | Madden . | |
|---|---|---|---|
| 944,568 | 12/1909 | Mercer . | |
| 986,015 | 3/1911 | Lambert . | |
| 1,922,702 | 8/1933 | Kristman | 43/131 |
| 2,054,730 | 9/1936 | Pierpoint . | |
| 2,167,978 | 8/1939 | Jennerich | 43/121 |
| 2,953,868 | 9/1960 | Chambers . | |
| 2,997,806 | 8/1961 | Duvall . | |
| 4,044,495 | 8/1977 | Nishimura et al. | 43/121 |
| 4,214,400 | 7/1980 | Patmore et al. | 43/121 |
| 4,251,946 | 2/1981 | Lindley . | |
| 4,263,740 | 4/1981 | Hemsarth et al. | 43/121 |
| 4,395,842 | 8/1983 | Margulies | 43/121 |
| 4,563,836 | 1/1986 | Woodruff et al. | 43/121 |
| 4,658,536 | 4/1987 | Baker | 43/131 |

FOREIGN PATENT DOCUMENTS

| 5087485 | 6/1986 | Australia . | |
|---|---|---|---|
| 155480 | 1/1939 | Fed. Rep. of Germany | 43/121 |
| 2023987 | 1/1980 | United Kingdom | 43/131 |

Primary Examiner—Nicholas P. Godici
Assistant Examiner—Karen Skillman
Attorney, Agent, or Firm—Melvin H. Kurtz

[57] ABSTRACT

A feeding station for vermin which allows for ingress of the vermin to feed on a poisoned bait held at a central portion therein and for their subsequent egress is described. It comprises a base having at least one inclined ramp which, preferably, has a substantially flat floor, the ramp leading inwardly from the more peripheral sections of the base member to a more raised position adjacent a single central well holding a poisoned bait for the vermin. Peripheral wall means bounding and closing off a substantial portion of the interior of the feeding station from the exterior and having at least one opening to the outer and lower portion of the inclined ramp leading to the central well adapted to hold the bait are also provided. A cover is also provided which is joined to the top of the base member to cover the central well holding the poisoned bait and to also cover a substantial portion of the ramp and wall means. Finally, support means adjacent the periphery of the base member can be provided to inhibit crushing of the cover.

5 Claims, 3 Drawing Sheets

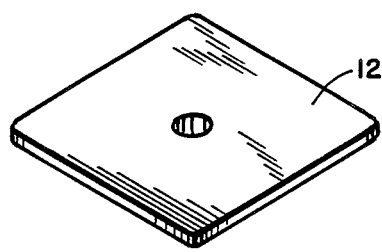
FIG.6
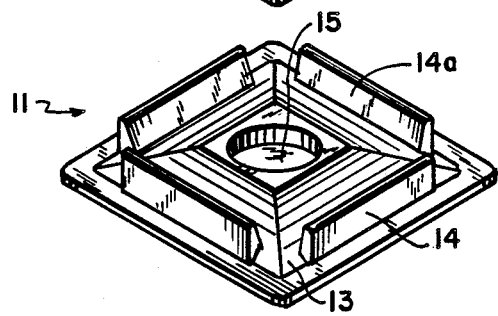
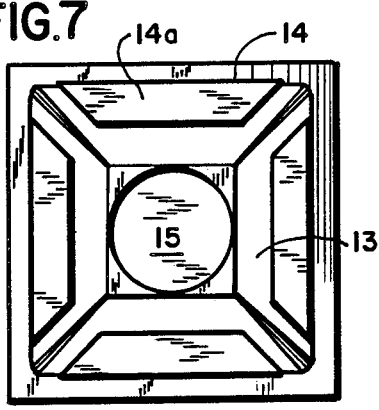
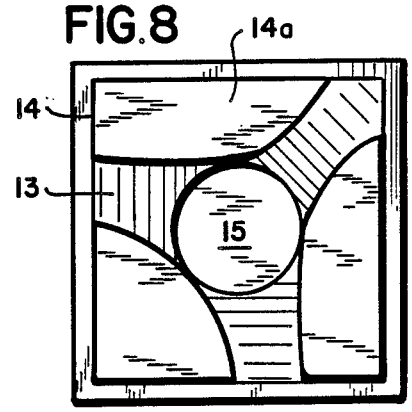
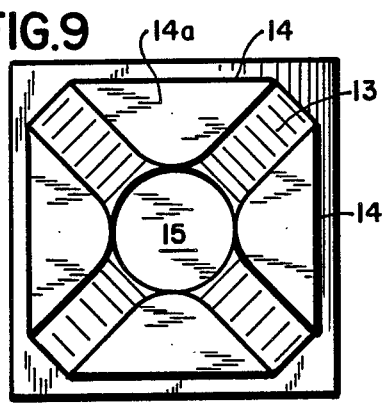

FEEDING STATION FOR VERMIN

BACKGROUND OF THE PRESENT INVENTION

1. Field of the Present Invention

The present invention is a feeding station for vermin, for example, insects, small rodents, and the like.

2. Description of the Prior Art

The present invention is a feeding station for vermin which allows for the ingress of the vermin to feed upon a poisoned bait contained in the feeding station and for their subsequent egress. Thus, the present invention is distinguishable from trap mechanisms which are intended to entrap or capture such vermin. Representative examples of traps that have been proposed for a variety of vermin (e.g., insects) are shown in U.S. Pat. Nos. 547,220, 944,568, 986,015, 2,054,730, 2,997,806, 4,044,495, 4,214,400, 4,251,946, and 4,263,740.

Certain U.S. patents have also described devices which were intended to hold poisoned bait included among these are U.S. Pat. No. 1,922,702 to N. A. Kristman, U.S. Pat. No. 2,958,868 to S. Chambers, and, more recently, U.S. Pat. No. 4,563,886 to K. Woodruff et al. The Kristman device relies upon a bait holder having corrugated grooves in an annular flange to provide a plurality of passages whereby ants, or such insects, can enter the device. The device shown in this patent has a cover which extends downwardly over the annular flange for only a portion of the distance towards its base. The Chambers device (U.S. Pat. No. 2,953,868) provides ramp means which allow for entry of insects, and the like, and a plurality of circular recesses exposed to the side of the entry pathway into which a poisoned bait might be provided. This patent teaches that such a design renders it nearly impossible for anyone to reach the position of the poison with their fingers. The Woodruff et al. patent (U.S. Pat. No. 4,563,886) describes an insect feeding station having a substantially flat floor with the central bait section being shielded from direct access from the exterior by either inner and outer walls having offset openings therein or by a single set of walls having outer circumferential portions and inwardly curved inner portions.

Also of interest is Australian Pat. No. 50874/85, published June 19, 1986, which shows a housing for an insect bait having a projection extending between the base member and the cover member with its vertical axis substantially centrally located relative to the bait receiving recess to prevent collapsing of the housing if weight is placed thereon. The base is described as defining a bait receiving recess which preferably has a raised central plateau surrounded by a peripheral flat, ground engaging, portion. A plurality of inclined ramps, separated from one another by walls, lead to the raised, central bait station from the periphery of the device.

SUMMARY OF THE PRESENT INVENTION

The present invention is a feeding station for vermin (e.g., insects, small rodents, and the like) which allows for the ingress of the vermin to feed on a poisoned bait held at a central portion therein and for their subsequent egress from the feeding station. The device comprises a base member having at least one inclined ramp which leads inwardly from the more peripheral portions of the base to a more raised position adjacent a single central well holding a poisoned bait for the vermin. Peripheral walls means, located adjacent the lower portion of the ramp means, bound and close off a substantial portion of the periphery of the feeding station from the exterior and have at least one opening to the inclined ramp means which lead inwardly to the central well of the base member. A cover is joined to the top of the base member to cover the central well holding the poisoned bait and a substantial portion of the ramp and wall means. Finally, support means to inhibit crushing of the cover are located adjacent the periphery of the base member.

DESCRIPTION OF THE DRAWINGS

The present invention will be further understood by reference to the Drawings which form a portion of the present specification. FIGS. 6-10 illustrate other embodiments for the feeding station of the present invention, and FIGS. 11-14 illustrate a third embodiment of the present invention wherein:

FIG. 1 is a perspective view of the first embodiment of the present invention showing the cover and base separated from one another;

FIG. 2 is a view similar to that of FIG. 1 wherein the cover and base have been joined and where arrows show representative ingress and egress pathways for the vermin;

FIG. 3 is a cross-sectional view taken along line 3—3 of FIG. 2 of the feeding station;

FIG. 4 is an overhead view of the base member shown in FIG. 1 taken along line 4—4;

FIG. 5 is a view of the cover taken along line 5—5 of FIG. 1 in the direction of the arrows;

FIG. 6 is a perspective view of another embodiment of the present invention showing the cover and base separated from one another;

FIGS. 7-10 are overhead views of base members for other embodiments;

FIG. 11 is a perspective view of yet another embodiment of the feeding station of the present invention;

FIG. 12 is a cross-sectional view of the feeding station of FIG. 11 taken along lines 12—12 of FIG. 11 in the direction of the arrows;

FIG. 13 is an overhead view of the base, containing poisoned bait, of the feeding station of FIGS. 11 and 12; and FIG. 14 is a view of the inside of the cover of the feeding station of FIGS. 11-12.

DETAILED DESCRIPTION OF THE PRESENT INVENTION

Figure 1:
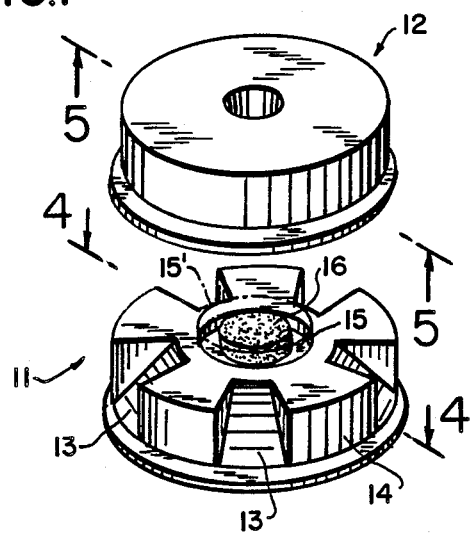
FIGS. 1-5 illustrate one embodiment of the present invention.
Figure 2:
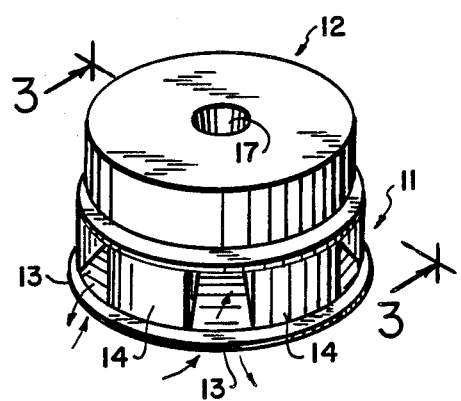

FIGS. 1-5 illustrate an embodiment of the present invention having the number of openings in the exterior or peripheral wall and the thickness of such a wall cooperates to form a configuration which yields a plurality of ramp means bounded by relatively thick walls. The thickness of the walls is great enough to extend from the outer surface of the peripheral walls the entire distance to the outer periphery of the central bait station so that the walls separate each of the inclined ramps from one another. The feeding station comprises base 11 and cover 12. The cover overlies or covers substantial portion of the inclined ramps 13 (which preferably have a substantially flat floor) up which vermin can walk an the walls 14 which have a thickness which makes them extend inwardly towards the center of the station dividing the ramps 13 from one another. The ramps and walls, in such a structure, both extend radially outwardly towards the more peripheral sections of the base 11 from a single central well 15 holding poisoned bait 16. An inwardly protruding member 17 in the top of cover 12 can aid in holding bait 16 in the well. It does not, however, extend far enough between cover and base to function as a support to inhibit crushing of the cover if weight is applied to the assembly. The means to inhibit crushing of cover 12 lie at the more peripheral sections of the station and comprise side wall 12a of cover 12 which rests upon the top surface 14a of peripheral wall 14. The embodiment shown in FIGS. 1-5 has five ramps 13, five walls 14 therebetween and is of circular shape.

Figure 3:
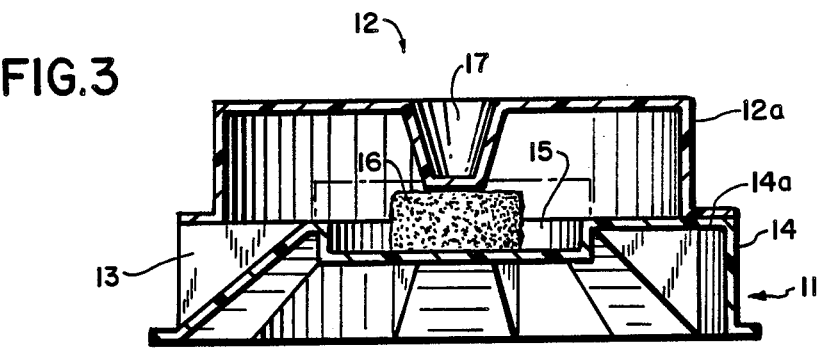
Figure 4:
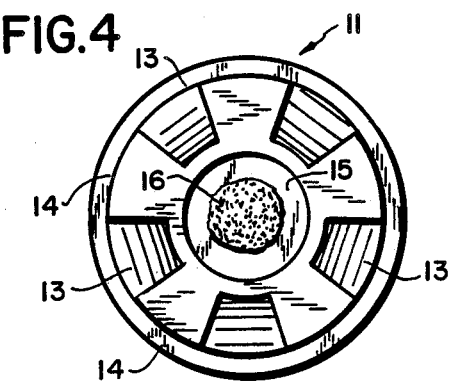
Figure 5:
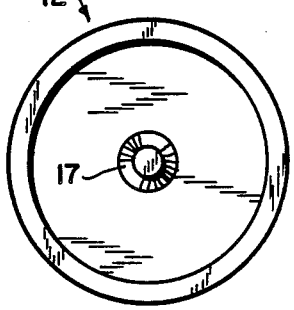
Figure 11:
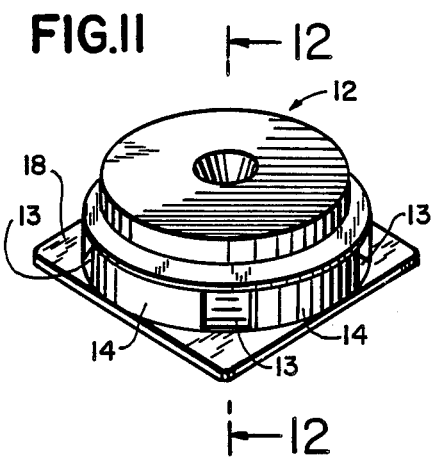
Figure 12:
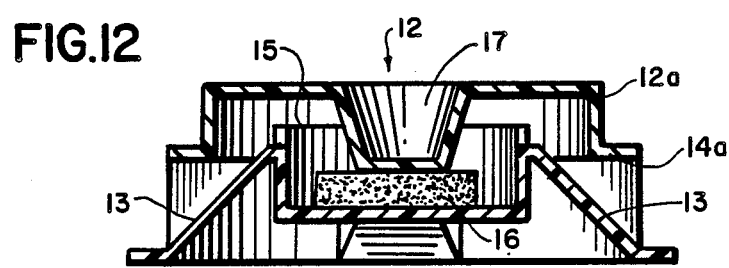
Figure 13:
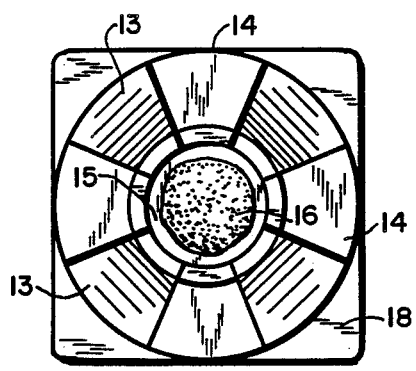
Figure 14:
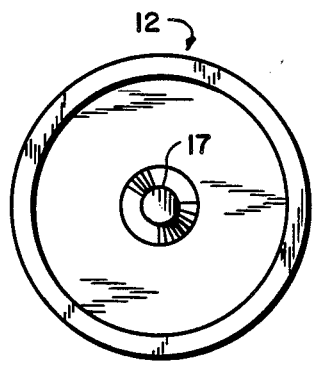

FIGS. 6-10 show other embodiments of the claimed invention in which cover 12 (as shown in FIG. 6) can be relatively flat so as to be devoid of the depending side wall 12a shown in FIG. 3. In this case, the upper surface 14a of exterior wall 14 is the support means for the cover. In FIG. 6, the exterior or peripheral walls are very thin so that the ramp area 13 surrounding the periphery of the central bait well is very open. In other words, the exterior walls 14 are not thick enough to form dividing walls between a plurality of ramps leading to the central well 15 from the respective openings in the exterior wall 14. FIGS. 7 and 10 show embodiments having slightly thicker walls than the embodiment shown in FIG. 6 and they close off the ramp areas inside the walls to a greater degree. However, the vermin can still walk around the entire periphery of the central well if they wish. The designs in FIGS. 8 and 9 have still relatively thicker walls so as to extend to the very periphery of the well. These constructions, like those in FIGS. 1, 2 and 4, result in a plurality of individual ramps 13 each separated from one another between the entry to the ramps at the peripheral walls 14 of the feeding station base and the central bait well and preclude vermin walking around the central bait well once they have entered the feeding station.

FIGS. 11-14 show an embodiment of the present invention quite close in construction to that of FIGS. 1-5 with the exception that it has only four ramps and walls and the base has a square foot member 18.

In all of the embodiments of the present invention, the exterior walls provided a degree of security for the vermin (e.g., an insect, such as a cockroach) inducing it to remain and feed on the poisoned bait even in those embodiments (e.g., FIGS. 6, 7 and 10) which have relatively thin outer walls to create a relatively open interior ramp area around the periphery of the central bait well. In such embodiments, there is an absence of inwardly leading wall surfaces, between ramps, from the openings in the exterior wall means to the bait area which would tend to direct the vermin to the bait area.

The foregoing are intended to illustrate certain embodiments of the present invention and should not, therefore, be taken in a limiting sense. The scope of protection that is sought is set forth in the claims which follow.

I claim:

1. A feeding station for vermin which allows for the ingress of the vermin, to feed on a poisoned bait held at a central portion therein, and for their subsequent egress from the feeding station, which comprises:
    (a) a base member having at least one inclined ramp leading from more peripheral sections of the base member inwardly to a more raised position adjacent a single central wall adapted to hold a poisoned bait for the vermin;
    (b) peripheral wall means bounding and closing off a substantial portion of the interior sections of the feeding station from the exterior and having at least one opening therein in communication with the inclined ramp which leads inwardly to the central well of the base member;
    (c) a cover joined to the top of the base member to cover the central well holding the poisoned bait and a substantial portion of the ramp and wall means, the cover having an inwardly protruding member in contact with top surface of the poisoned bait to aid in holding the bait in the central well; and
    (d) support means to inhibit crushing of the cover located adjacent the periphery of the base member.

2. A feeding station for vermin which allows for the ingress of the vermin, to feed on a poisoned bait held at a central portion therein and for their subsequent egress from the feeding station, which comprises:
    (a) a base member having at least one inclined ramp leading from more peripheral sections of the base member inwardly to a more raised position adjacent a single central well adapted to hold a poisoned bait for the vermin;
    (b) peripheral wall means bounding and closing off a substantial portion of the interior sections of the feeding station from the exterior and having at least one opening therein in communication with the inclined ramp which leads inwardly to the central well of the base member, the thickness of the peripheral walls being less than needed to extend to the periphery of the central well; and
    (c) a cover joined to the top of the base member to cover the central well holding the poisoned bait and a substantial portion of the ramp and wall means, the cover having an inwardly protruding member in contact with top surface of the poisoned bait to aid in holding the bait in the central well.

3. A feeding station as claimed in claim 1 wherein the peripheral wall means has a thickness extending to the periphery of the central well and a plurality of inclined ramps are present in the station.

4. A feeding station as claimed in claim 1 wherein the peripheral wall means has a thickness extending only partly to the periphery of the central well to leave an open path around the central well and a plurality of inclined ramps are present in the station.

5. A feeding station as claimed in claim 2 which comprises a plurality of inclined ramps.

* * * * *